Sept. 15, 1964  D. J. FREIMAN  3,148,406
HANDLE ATTACHING MEANS
Filed July 27, 1962

INVENTOR.
DAVID J. FREIMAN
BY Clarence R. Patty, Jr.
ATTORNEY

३,१४८,४०६
HANDLE ATTACHING MEANS
David John Freiman, Corning, N.Y., assignor to Corning
Glass Works, Corning, N.Y., a corporation of New
York
Filed July 27, 1962, Ser. No. 212,847
2 Claims. (Cl. 16—121)

The present invention relates to clamping devices and particularly to devices especially suitable for use in the attachment of a handle or knob onto a utensil such as a piece of frangible kitchen or table ware or the like.

Cheese and cake covers of metal in the form of inverted bowls are in common usage and because of the non-frangible characteristic of metal, such covers are readily provided with knobs, as by means of a rivet or bolt passing through the cover wall, but such means of attachment are not readily applicable to frangible materials.

According to the invention, attaching means is provided that is especially suited for the firm attachment of knobs and the like even to thin wall and relatively frangible glass cheese and cake covers and to similar articles without danger of their breakage during their assembly or use.

Such attaching means comprises a washer of resilient material having a relatively thin walled tubular extension from one side of an axial passage therethrough and whose free end is axially separated into a plurality of fingers that are outwardly bendable after passage of the extension through a passage of the wall of the cover to which a handle or knob is to be attached.

Attachment of a knob to the cover is effected by introducing a screw into the washer from its non-tubulated side and which is projected through the extension and screw threaded into such knob with the fingers radially directed and clamped between the opposing knob and cover surfaces. Conveniently the length of the tubular portion of the extension exceeds the wall thickness of the cover portion through which it passes and is outwardly distorted, as attachment is effected by the screw, to substantially fill any space between the passage in the cover wall and the tubular extension to firmly hold the knob from any lateral movement with respect to the cover. Preferably the surface of the knob facing the cover wall is in the form of an inverted shallow-walled cup whose wall closes the space between the cover surface taken up by the fingers of the tubular extension of the washer.

For a more detailed description of the invention, reference is now made to the accompanying drawing wherein.

Figure 1:
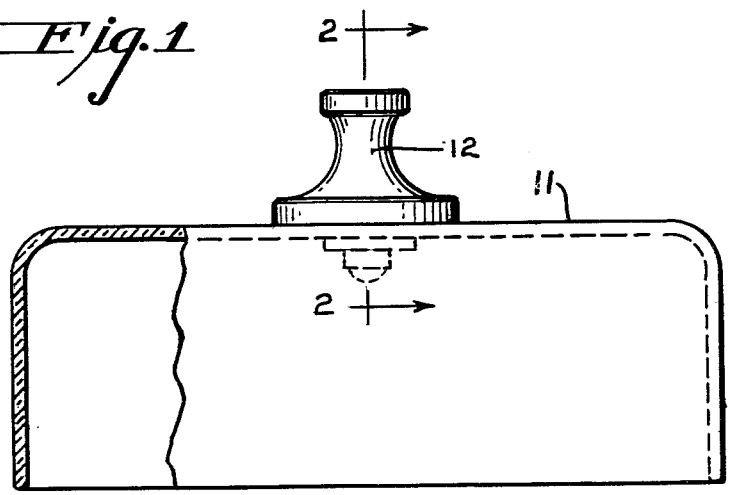
FIG. 1 is a side elevational view, partly in section, of a cheese cover embodying the invention.

Referring to the drawing in detail, the numeral 11 designates an article of frangible material, such as glass, usable as a cake or cheese cover and for similar purposes.

As will be observed, cover 11 has a knob 12 attached thereto through the medium of a washer 13, having a tubular extension 14 passing through a cover aperture 16 and at its free end separated into a plurality of fingers such as 15.

Figure 2:
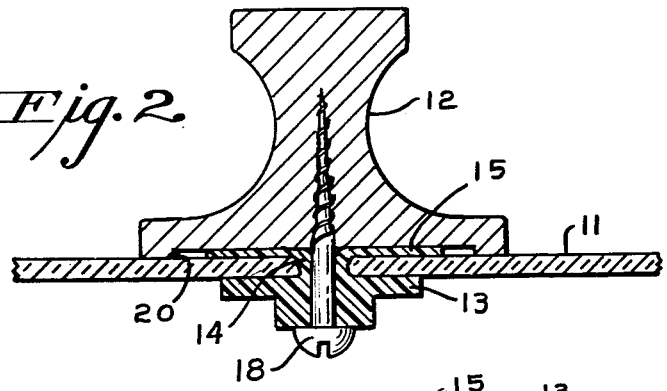
FIG. 2 is a sectional view, on an enlarged scale, taken on line 2—2 of FIG. 1.
Figure 3:
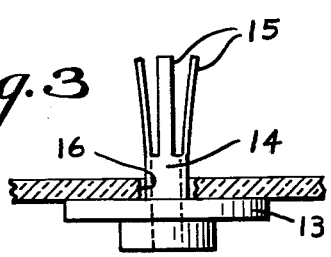
FIG. 3 is a side elevational view of a special washer embodied in the invention with its tubular portion passed through a fragment of the cover which is shown in section.
Figure 4:
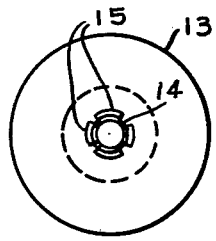
FIG. 4 is a top plan view of the washer of FIG. 2.

In FIG. 2, the cover 11, washer 13 and a knob 12 are shown tightly clamped together by means of a screw 18, the fingers 15 having been bent outwardly radially at the outset of assembly as illustrated in FIG. 3. As the head of the screw 18 became seated against washer 13, its tubular extension 14 became squashed in the cover aperture 16 between the opposing washer and knob surfaces, as illustrated in FIG. 2, and the fingers 15 became clamped between the opposing surfaces of the knob and cover respectively.

A bordering wall 20 of knob 12 forms its underside into a shallow walled cup whose wall depends from the bottom thereof a distance comparable to the space remaining between such bottom surface and the oppositely facing surface of the cover when fingers 15 are firmly squeezed between such bottom surface and the cover 11 by the tightening of screw 18. The wall 20 thus prevents any bending forces occurring between the knob and the cover in use, thus reducing to an absolute minimum the danger of any bending forces being transmitted to the screw 18 that might otherwise result in placing a breaking strain in the cover. Wall 20 also serves to prevent the entry of dirt in such space.

What is claimed is:

1. The combination with a utensil having a passage through a wall thereof for the attachment of a handle thereto, a washer of yieldable material arranged against one side of such wall and having a tubular extension occupying such passage, a plurality of fingers extending radially from the free end of such tubular extension on the opposite side of such wall, a handle having a recessed surface engaging said fingers on the opposite side of such wall, a clamping screw passing through said washer and its tubular extension and screw threaded into said handle, and said tubular extension being axially compressed within the confines of said passage between the washer on one side of such wall and the fingers on the opposite side thereof with the finger squeezed between the oppositely facing surfaces of said utensil wall and said handle.

2. A handle attachment assembly for use with frangible ware items comprising, a washer of resilient material having an axial passage extending therethrough and positioned adjacent one surface of a ware item having an aperture therein, a hollow tubular extension formed integrally with said washer and extending from one side of said axial passage through said aperture, a plurality of fingers extending from said tubular extension radially outwardly over an opposite surface of such ware item, a handle positioned over such fingers, and a screw extending through said washer and its tubular extension in threaded engagement with said handle to secure said handle to the ware item with portions of said resilient washer maintained in compression against the ware item.

References Cited in the file of this patent
UNITED STATES PATENTS

| | | |
|---|---|---|
| 470,919 | Rogers | Mar. 15, 1892 |
| 1,755,301 | McCullough | Apr. 22, 1930 |
| 2,068,922 | Marchand | Jan. 26, 1937 |
| 2,095,397 | Overmyer | Oct. 12, 1937 |